(12) United States Patent
Honjo

(10) Patent No.: US 11,528,408 B1
(45) Date of Patent: Dec. 13, 2022

(54) IMAGE CAPTURING APPARATUS AND CONTROL METHOD FOR IMAGE CAPTURING APPARATUS

(71) Applicant: CANON KABUSHIKI KAISHA, Tokyo (JP)

(72) Inventor: Wataru Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/686,260

(22) Filed: Mar. 3, 2022

(30) Foreign Application Priority Data

Mar. 8, 2021 (JP) .............................. JP2021-036674

(51) Int. Cl.
*H04N 5/232* (2006.01)

(52) U.S. Cl.
CPC ... *H04N 5/232127* (2018.08); *H04N 5/23218* (2018.08); *H04N 5/23299* (2018.08)

(58) Field of Classification Search
CPC ......... H04N 5/232127; H04N 5/23299; H04N 5/23218
USPC .......................................................... 348/345
See application file for complete search history.

(56) References Cited

U.S. PATENT DOCUMENTS

| | | | | |
|---|---|---|---|---|
| 8,742,890 | B2* | 6/2014 | Gocho .................... | G03B 17/38 348/207.1 |
| 9,967,470 | B2* | 5/2018 | Paz ........................ | H04N 7/185 |
| 10,281,554 | B2* | 5/2019 | Wang ....................... | G01S 19/26 |
| 11,399,137 | B2* | 7/2022 | Janjic ...................... | G01S 19/49 |
| 2009/0315671 | A1* | 12/2009 | Gocho ............. | H04N 21/42204 340/5.8 |
| 2014/0009632 | A1* | 1/2014 | Glover ............... | H04N 5/23299 348/211.99 |
| 2015/0334311 | A1* | 11/2015 | Paz ....................... | H04N 5/2228 348/169 |
| 2017/0163881 | A1* | 6/2017 | Oshima .................. | H04N 7/183 |
| 2017/0353669 | A1* | 12/2017 | Hayashi ............. | H04N 5/23296 |
| 2018/0059207 | A1* | 3/2018 | Wang ................. | H04N 5/23299 |
| 2020/0053292 | A1* | 2/2020 | Janjic ........................ | G06T 7/70 |

(Continued)

FOREIGN PATENT DOCUMENTS

JP     2006-311099 A     11/2006

OTHER PUBLICATIONS

ONVIF™, PTZ Service Specification, Version 20.12, Dec. 2020, pp. 1-48.

*Primary Examiner* — Pritham D Prabhakher
(74) *Attorney, Agent, or Firm* — Canon U.S.A., Inc., IP Division

(57) ABSTRACT

An image capturing apparatus is provided and includes a driving unit configured to drive the image capturing apparatus and change an imaging region by an image capturing unit; a tracking unit configured to track a subject included in the imaging region in a captured video obtained by the image capturing unit; a communication unit configured to receive a control command from an external apparatus; and a control unit configured to control at least one of the driving unit and the tracking unit based on a control command received by the communication unit. When a control command includes a change request to change an imaging region and a tracking request to track a subject and there is an inconsistency in a setting value group of the change request, the control unit does not use at least one setting value included in the setting value group.

12 Claims, 4 Drawing Sheets

(56) References Cited

U.S. PATENT DOCUMENTS

2020/0059595 A1\* 2/2020 Ono .................. B64C 39/024
2020/0128188 A1\* 4/2020 Iwasaki ................ H04N 7/18

\* cited by examiner

IMAGE CAPTURING APPARATUS AND CONTROL METHOD FOR IMAGE CAPTURING APPARATUS

BACKGROUND

Field

The present disclosure relates to a technique for driving an image capturing apparatus to track a subject.

Description of the Related Art

A monitoring camera drives a pan-tilt-zoom (PTZ) mechanism to change the imaging region (referred to as optical PTZ). For example, by continuously driving the PTZ mechanism, it becomes possible to track (referred to as optical tracking) the subject. Unlike optical tracking, tracking (referred to as cropping tracking) a subject is performed in which a partial region is cropped from a captured video and the region to be cropped is continuously changed (referred to as digital PTZ). Japanese Patent Laid-Open No. 2006-311099 (Patent Literature 1) discloses a technique for determining the presence or absence of a tracking operation in accordance with a situation of a subject in an imaging region.

There is Open Network Video Interface Forum (ONVIF) as a common standard related to connection between a monitoring camera and a video reception client apparatus. In "ONVIF PTZ Service Specification Version 20.12" issued by ONVIF in December, 2020, MoveAndStartTracking command for starting a tracking operation after driving an image capturing mechanism in a designated direction is described. This command is a command for, by designating a profile including a setting of an image capturing unit and an operation method of the image capturing unit, tracking a subject present in an imaging region after PTZ driving by the designated operation method. The profile includes video source configuration (VideoSourceConfiguration), PTZ configuration (PTZConfiguration), and the like.

The above-described MoveAndStartTracking command designates, as a control value of the imaging region movement, one or more of position information, the position in the PTZ coordinate space, a preset position set in advance, and an identifier of the subject.

However, in the ONVIF standard, there is no way to inform whether or not the PTZ configuration included in the profile is a setting value for optical PTZ or a setting value for digital PTZ. Therefore, a combination of the video source configuration and the PTZ configuration in the profile is not consistent, and there can be a problem that driving and tracking cannot be performed. There also can be a problem that the operation method of the image capturing unit designated by the MoveAndStartTracking command and the PTZ configuration are not consistent, and driving and tracking cannot be performed.

In a case where there is an inconsistency and the operation to be performed becomes unstable, it is possible to control to determine as an error and stop the tracking operation as in Patent Literature 1. However, if the tracking operation is uniformly stopped in a case where there is an inconsistency, the tracking operation cannot be performed in many cases, which causes inconvenience to the user.

SUMMARY

According to one aspect of the present disclosure, an image capturing apparatus comprises: one or more memories including instructions stored thereon that, when executed by the one or more processors, cause the image capturing apparatus to function as: a driving unit configured to drive the image capturing apparatus and change an imaging region by an image capturing unit; a tracking unit configured to track a subject included in the imaging region in a captured video obtained by the image capturing unit; a communication unit configured to receive a control command from an external apparatus; and a control unit configured to control at least one of the driving unit and the tracking unit based on a control command received by the communication unit; wherein when a control command received by the communication unit includes a change request to change an imaging region and a tracking request to track a subject and there is an inconsistency in a setting value group of the change request, the control unit controls at least one of the driving unit and the tracking unit without using at least one setting value included in a setting value group of the change request.

The present disclosure enables a more suitable tracking operation in an image capturing apparatus.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
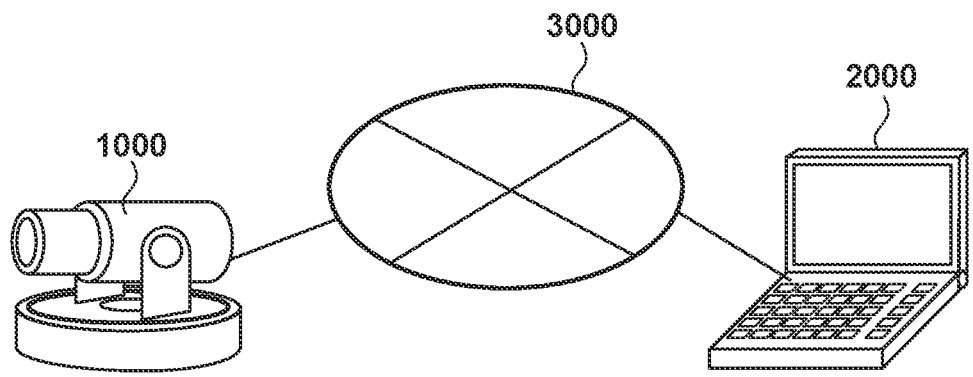
FIG. 1 is a view illustrating a system configuration.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

As the first embodiment of an image capturing apparatus according to the present disclosure, a camera having functions of an optical PTZ and a digital PTZ will be described below as an example.

<Configuration of Each Apparatus of System>

FIG. 1 is a view illustrating the system configuration in the first embodiment. The system includes a camera 1000 and a client apparatus 2000 communicatively connected to each other via a network 3000. The camera 1000 has functions of the optical PTZ and the digital PTZ. The client apparatus 2000, which is an external apparatus, transmits a command such as PTZ control to the camera 1000. The camera 1000 performs a process with respect to a received command and transmits a response to the client apparatus 2000.

Figure 2:
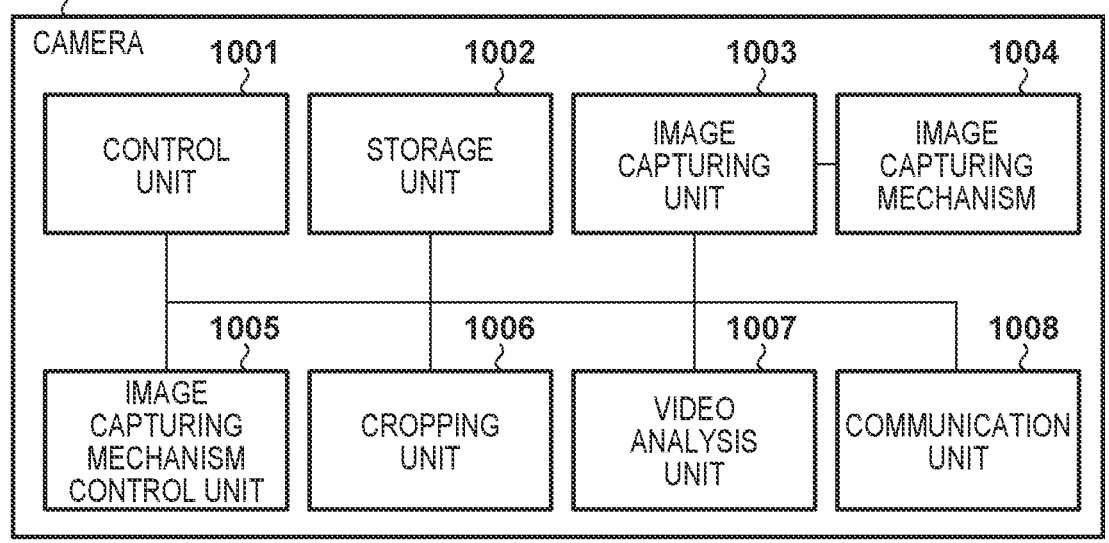
FIG. 2 is a block diagram illustrating an internal configuration of a camera.

FIG. 2 is a block diagram illustrating an internal configuration of the camera 1000. A control unit 1001 controls the entire camera 1000. The control unit 1001 can be implemented, for example, by a CPU executing various programs.

A storage unit 1002 stores a program executed by the control unit 1001 and is also used as a work area during execution of a program. The storage unit 1002 is also used as a storage area for various data. For example, image data generated by an image capturing unit 1003 and cropped image data generated by a cropping unit 1006 are stored. In addition, the direction of an image capturing mechanism controlled by an image capturing mechanism control unit 1005, the setting value of a cropped region controlled by the cropping unit 1006, and the like are stored.

The image capturing unit 1003 converts an analog signal of the subject image obtained by an image capturing mechanism 1004 into a captured image that is digital data. Then, the obtained captured image is output to the storage unit 1002.

The image capturing mechanism 1004 includes an image capturing optical system including a lens, an image capturing element and the like, and a pan-tilt-zoom (PTZ) mechanism, on which the image capturing optical system is mounted, configured to control an imaging region. The imaging region is a region to be captured by the image capturing unit 1003, and the imaging region is determined by the image capturing direction controlled by pan-tilt drive and the angle of view controlled by zoom drive. The image capturing mechanism control unit 1005 controls the PTZ mechanism of the image capturing mechanism 1004. After the control of the PTZ mechanism, values such as a position and a range related to the imaging region changed by the control are output to the storage unit 1002.

The cropping unit 1006 crops a partial region from the captured image obtained by the image capturing unit 1003, and outputs the same to the storage unit 1002. The region to be cropped from the captured image is designated by a command received from the client apparatus 2000 via a communication unit 1008. After the region to be cropped is changed, values such as the position and the range related to the cropped region are output to the storage unit 1002.

A video analysis unit 1007 is used to analyze the captured image stored in the storage unit 1002 and detect a moving object in the image. When a moving object is detected, an identifier for identifying the moving object is output to the storage unit 1002.

The communication unit 1008 receives each setting value change and control command from the client apparatus 2000 via the network 3000. In addition, a response to each command and various data such as image data stored in the storage unit 1002 are transmitted to the client apparatus 2000.

Note that the processing block configuration illustrated in FIG. 2 is an example, and is not limited to the configuration of FIG. 2. For example, a sound input unit and a sound output unit may be further included.

Figure 3:
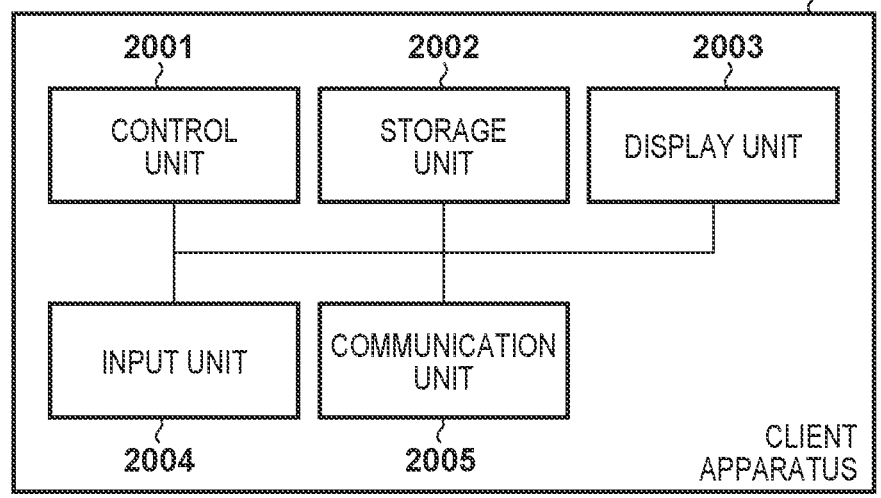
FIG. 3 is a block diagram illustrating an internal configuration of a client apparatus.

FIG. 3 is a block diagram illustrating an internal configuration of the client apparatus 2000. A control unit 2001 controls the entire client apparatus 2000. The control unit 2001 can be implemented, for example, by a CPU executing various programs.

A storage unit 2002 stores a program executed by the control unit 2001 and is also used as a work area during execution of a program. The storage unit 2002 is also used as a storage area for various data. For example, information and the like of connectable cameras existing on the network 3000 are stored.

A display unit 2003 includes, for example, an LCD display, and provides the user of the client apparatus 2000 with various information such as a setting screen, a data acquisition/display screen, a viewer of a video received from the camera 1000, and various messages.

An input unit 2004 includes, for example, a button, a touchscreen, and a mouse, receives an operation from the user, and notifies the control unit 2001 of the received content.

A communication unit 2005 transmits each change command including an imaging region change to the camera 1000 via the network 3000. A response to each change command and a video stream are received from the camera 1000.

Note that the processing block configuration illustrated in FIG. 3 is an example, and is not limited to the configuration of FIG. 3. For example, a received video display unit, an image analysis processing unit, and a video accumulation unit may be further included.

<Operation of Each Apparatus of System>

Figure 4:
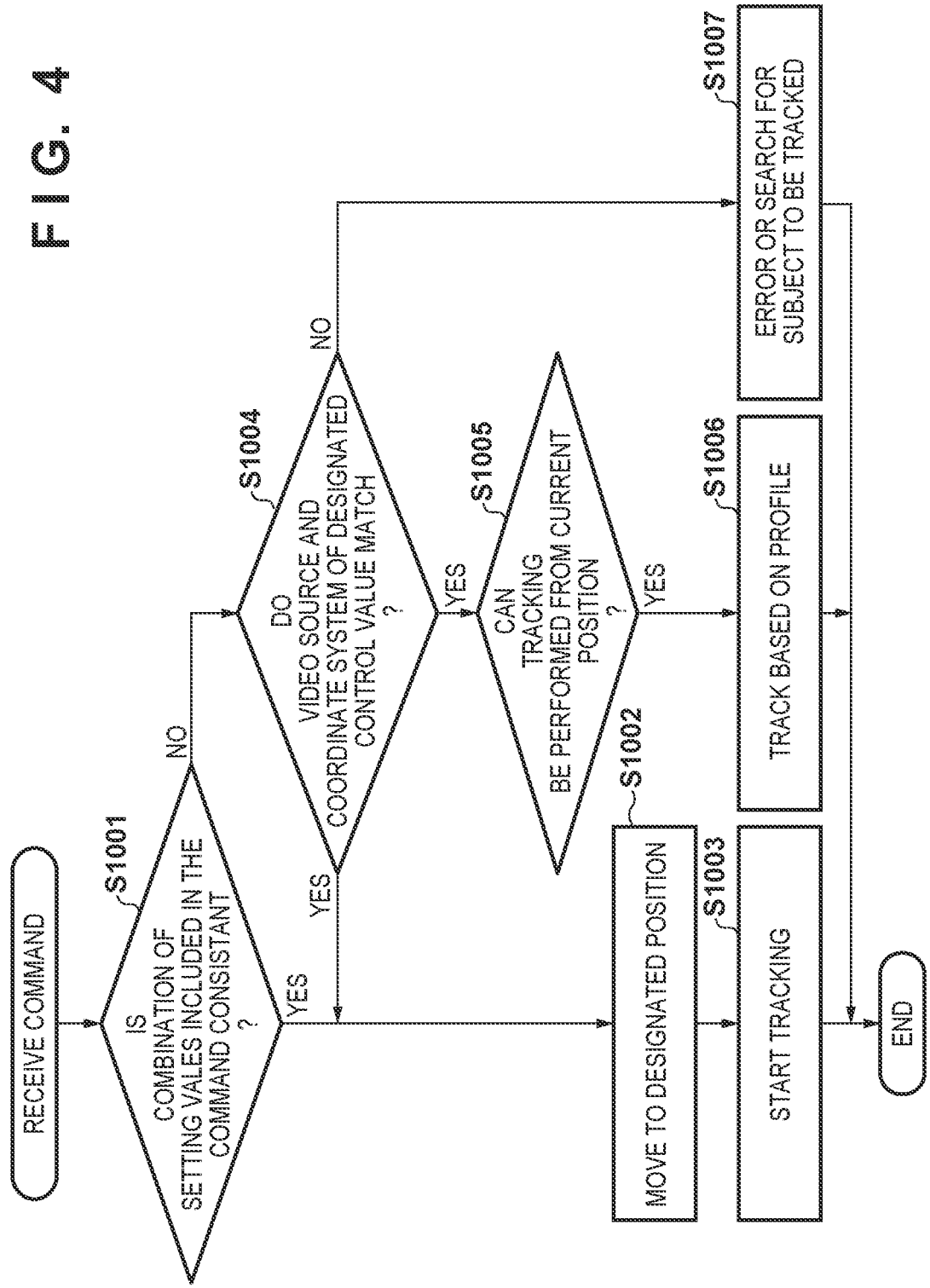
FIG. 4 is a flowchart illustrating a determination method of a tracking operation in a first embodiment.

FIG. 4 is a flowchart illustrating the determination method of a tracking operation in the first embodiment. More specifically, FIG. 4 explains the operation performed by the control unit 1001 of the camera 1000 when the MoveAndStartTracking command defined in ONVIF is received from the client apparatus 2000. More specifically, FIG. 4 explains the control of the image capturing direction (optical PTZ) and determination of the tracking operation (optical PTZ or digital PTZ). As described in the related art, the MoveAndStartTracking command is a command in which a change request for an imaging region and a tracking request for a subject are combined.

In S1001, the control unit 1001 checks consistency of a combination of setting values included in the received command (MoveAndStartTracking command). The command includes an identifier of a profile associated with the image capturing apparatus 1000 and a setting value group (PTZ control value) for performing PTZ control. As described in the related art, the profile includes a setting value group (video source configuration) related to the video type and a setting value group (PTZ configuration) related to the PTZ control. Note that as the setting value groups (video source configuration) related to the video type, there is VideoSourceConfiguration related to the setting of the resolution, ratio, and the like of the output video. As the setting group (PTZ configuration) related to the PTZ control, there is PTZConfiguration related to the coordinate system of pan-tilt (PT), setting of a movable range, and the like. Therefore, the control unit 1001 checks whether or not these setting value groups (i.e., video source configuration, PTZ configuration, and PTZ control value) are consistent.

When the combination of the setting values (the setting value group and the PTZ control value) included in the command is consistent, the process proceeds to S1002, where the control unit 1001 drives (optical PTZ) the image capturing mechanism 1004 via the image capturing mechanism control unit 1005 to the PTZ position designated in the MoveAndStartTracking command. Thereafter, the process proceeds to S1003, where the control unit 1001 starts a tracking operation (optical PTZ or digital PTZ) based on the information of the profile designated in the MoveAndStart- Tracking command. Here, the profile includes PTZConfiguration. Two types of PTZConfiguration having different coordinate systems and the like are prepared for the optical PTZ and the digital PTZ. In S1003, for example, the control unit 1001 performs the tracking operation according to the optical PTZ if PTZConfiguration included in the designated profile corresponds to the optical PTZ. On the other hand, if the PTZConfiguration corresponds to the digital PTZ, the tracking operation is performed according to the digital PTZ. When the combination of the setting values included in the command is not consistent in S1001, the process proceeds to S1004.

For example, it is assumed that, in the received command, the setting of the video source configuration (VideoSourceConfiguration) related to the video type is the setting of the whole video display, and the PTZ configuration (PTZConfiguration) is the setting of the digital PTZ. Here, the setting of the whole video display means a setting of displaying, without cropping, the video acquired by the image capturing optical system. At this time, determining that the video source configuration and the PTZ configuration included in the received command are not consistent, the control unit 1001 determines in S1001 that the combination of the setting values included in the command is not consistent. On the other hand, when the video source configuration is the setting of the whole video display and the PTZ configuration is the setting of the optical PTZ in the received command, the control unit 1001 determines in S1001 that the combination of the setting values included in the command is consistent. It is assumed that the PTZ configuration is the setting of the optical PTZ and the control value for moving to the PTZ position designated in the MoveAndStartTracking command is designated in the coordinate system for the digital PTZ. In this case, determining that the PTZ configuration and the PTZ control value included in the profile are not consistent, the control unit 1001 determines in S1001 that the combination of the setting values included in the command is not consistent. When the PTZ configuration is the setting of the digital PTZ and the control value for moving to the PTZ position designated in the MoveAndStartTracking command is designated in the coordinate system for the digital PTZ, the control unit 1001 determines that the combination of the setting values included in the command is consistent.

In S1004, the control unit 1001 determines whether or not the video source configuration and the coordinate system of the PTZ control value are consistent. When the video source configuration and the coordinate system of the PTZ control value are consistent, the processing proceeds to S1002, where the control unit 1001 ignores the PTZ configuration included in the profile, and drives (optical PTZ) the image capturing mechanism 1004 to the designated PTZ position by the control using the designated PTZ control value. Thereafter, the processing proceeds to S1003, where the control unit 1001 starts the tracking operation (optical PTZ or digital PTZ) based on the information of the designated profile. On the other hand, in a case of being not consistent, the process proceeds to S1005.

For example, in a case where the whole video display is set as the video source configuration and the control value of the optical PTZ is designated, the control unit 1001 determines that the combination is consistent.

In S1005, the control unit 1001 determines whether or not tracking can be performed from the current position. When the control unit 1001 determines that the tracking is possible, the processing proceeds to S1006, where the control unit 1001 starts the tracking operation (digital PTZ or optical PTZ) based on the information of the profile. When the control unit 1001 determines that the tracking is not possible, the processing proceeds to S1007, where the control unit 1001 returns an error to the client apparatus 2000 or performs processing of searching for a subject to be tracked.

For example, in a case where the imaging region cannot be controlled but the subject is included in the video currently being captured, such as a case where a PTZ control value for digital PTZ is designated for a profile in which optical PTZ is designated as the PTZ configuration, it is determined that the tracking is possible (by digital PTZ). On the other hand, in a case where the imaging region cannot be controlled and the subject is not included in the video currently being captured, it is determined that the tracking is not possible.

Note that, when it is determined in the processing of S1004 that there is inconsistency, an error may be returned to the client apparatus 2000 without proceeding to the processing of S1005. In the processing of S1006, instead of tracking based on the information of the profile, tracking may be performed with a designated PTZ control value.

As described above, according to the first embodiment, the camera 1000 determines an executable tracking operation when the combination of the setting values included in the received command is not consistent. In particular, when the video source configuration and the coordinate system of the PTZ control value are consistent, the PTZ configuration included in the profile is ignored, and the image capturing mechanism 1004 is driven to the PTZ position by the optical PTZ. In addition, even when the video source configuration and the coordinate system of the PTZ control value are not consistent, if it is determined that tracking can be performed from the current PTZ position, the tracking operation is performed by the digital PTZ. With these controls, even when there is an inconsistency in the command, it is possible to perform the tracking operation within an executable range without determining that there is an error and stopping the tracking operation.

Second Embodiment

In the second embodiment, an operation of another mode executed by the camera when the MoveAndStartTracking command is received will be described. Since the configuration of each apparatus of the system is similar to that of the first embodiment (FIGS. 1 to 3), the description thereof will be omitted.

<Operation of Each Apparatus of System>

Figure 5:
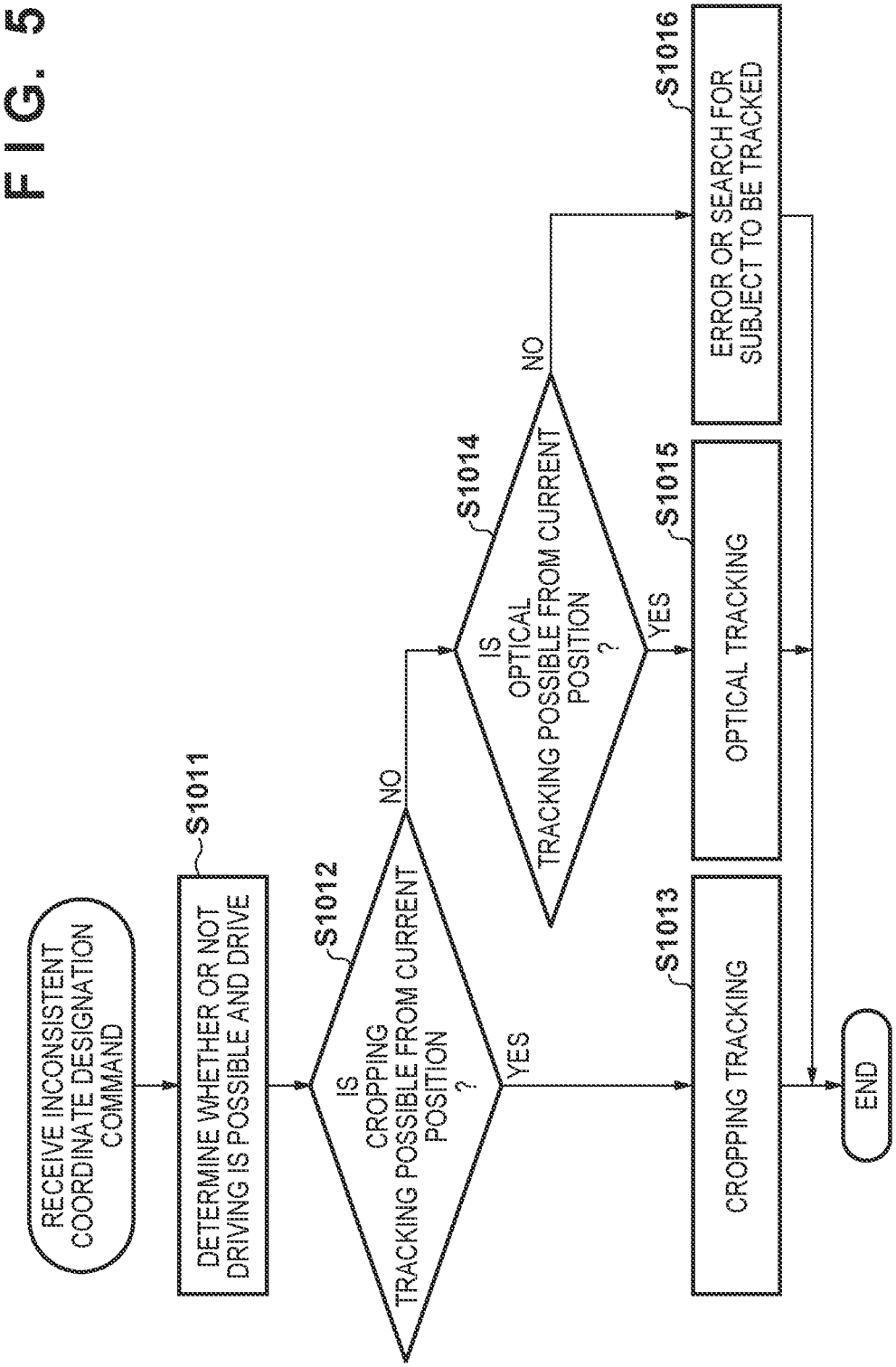
FIG. 5 is a flowchart illustrating a determination method of a tracking operation in a second embodiment.

FIG. 5 is a flowchart illustrating the determination method of a tracking operation in the second embodiment. More specifically, FIG. 5 explains the operation performed by the control unit 1001 of the camera 1000 when the MoveAndStartTracking command including inconsistent coordinate designation is received.

In S1011, the control unit 1001 determines whether or not PTZ driving can be performed from the combination of setting values (setting value group and PTZ control value) included in the received command (MoveAndStartTracking command). If driving is possible, driving (optical PTZ) is performed up to a designated PTZ position corresponding to a start position at which tracking described in the MoveAndStartTracking command is started. Note that the processing of S1011 is similar to that of the integration of the processing of S1001, S1004, and S1002 in the first embodiment (FIG. 4), and thus description thereof will be omitted.

In S1012, the control unit 1001 determines whether or not tracking using digital PTZ is possible. Specifically, based on the identifier of the subject included in the received command and the current position of the digital PTZ, the control unit 1001 determines whether or not the subject matching the identifier exists in the imaging region of the digital PTZ. Then, it is determined that tracking is possible if the subject exists in the imaging region, and it is determined that tracking is impossible if the subject does not exist. When the control unit 1001 determines that tracking is possible, the processing proceeds to S1013, where the control unit 1001 starts tracking (digital PTZ) by video cropping via the cropping unit 1006. On the other hand, when the control unit 1001 determines that tracking is impossible, the process proceeds to S1014.

In S1014, the control unit 1001 determines whether or not tracking by optical PTZ is possible. Specifically, the control unit 1001 determines whether or not a subject matching the designated identifier exists in the range of the entire imaging region. Then, it is determined that tracking is possible if the subject exists in the imaging region, and it is determined that tracking is impossible if the subject does not exist. When the control unit 1001 determines that tracking is possible, the processing proceeds to S1015, where the control unit 1001 starts tracking (optical PTZ) by driving of the image capturing mechanism 1004 via the image capturing mechanism control unit 1005. On the other hand, when the control unit 1001 determines that tracking is impossible, the processing proceeds to S1016, where the control unit 1001 returns an error to the client apparatus 2000 or performs processing of searching for a subject to be tracked.

When the subject moves out of the trackable range of the digital PTZ after the start of the tracking using the digital PTZ in S1013, the tracking may be continued by switching to the tracking using the optical PTZ.

As described above, according to the second embodiment, the camera 1000 determines an executable tracking operation when the combination of the setting values included in the received command is not consistent. In particular, when a subject matching the identifier of the subject included in the command exists in the current imaging region, the tracking operation (digital PTZ or optical PTZ) is executed. With these controls, even when there is an inconsistency in the command, it is possible to perform the tracking operation within an executable range without determining that there is an error and stopping the tracking operation.

Third Embodiment

In the third embodiment, an operation of still another mode executed by the camera when the MoveAndStartTracking command is received will be described. Since the configuration of each apparatus of the system is similar to that of the first embodiment (FIGS. 1 to 3), the description thereof will be omitted.

<Operation of Each Apparatus of System>

Figure 6:
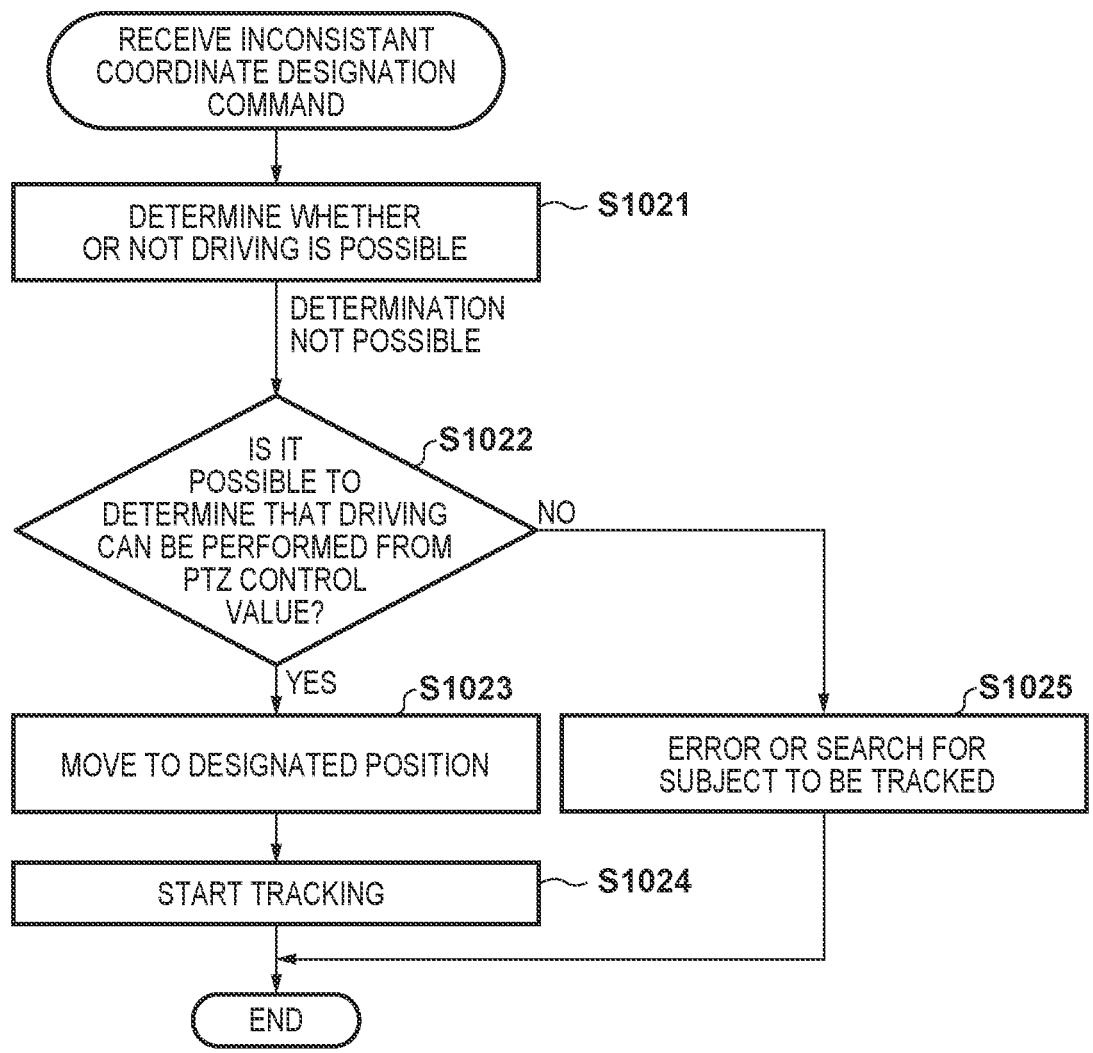
FIG. 6 is a flowchart illustrating a determination method of a tracking operation in a third embodiment.

FIG. 6 is a flowchart illustrating the determination method of a tracking operation in the third embodiment. More specifically, FIG. 6 explains the operation performed by the control unit 1001 of the camera 1000 when the MoveAndStartTracking command including inconsistent coordinate designation is received.

In S1021, the control unit 1001 determines whether or not PTZ driving can be performed from the combination of setting values (setting value group and PTZ control value) included in the received command (MoveAndStartTracking command). Note that the processing of S1021 is similar to that of the integration of the processing of S1001 and S1004 in the first embodiment (FIG. 4), and thus description thereof will be omitted. In a case where it is not possible to determine whether or not driving is possible as a result of the determination, the process proceeds to the processing of S1022.

In S1022, the control unit 1001 determines whether or not the PTZ configuration can be determined and whether or not the PTZ driving can be performed only with the PTZ control value for moving to the PTZ position designated in the received MoveAndStartTracking command. For example, when the PTZ control value includes an image capturing control request with designated position information and an image capturing control request with a designated preset position, it is possible to determine the PTZ configuration (optical PTZ or digital PTZ) to be used. Therefore, when such a PTZ control value is included in the command, the process proceeds to S1023. On the other hand, when the PTZ configuration cannot be determined only with the PTZ control value or the PTZ configuration can be determined but the PTZ driving cannot be performed, the process proceeds to S1025.

In S1023, the control unit 1001 determines the PTZ configuration only with the information of the PTZ control value while ignoring the setting value group of the profile, and, in the case of the optical PTZ, drives the image capturing mechanism 1004 to the designated PTZ position. In S1024, the control unit 1001 starts the tracking operation (optical PTZ or digital PTZ) based on the PTZ configuration determined in S1023.

In S1025, the control unit 1001 returns an error to the client apparatus 2000 or performs processing of searching for a subject to be tracked.

Note that the processing may be started from the processing of S1022 without performing the processing of S1021. That is, the processing of S1022 may be performed immediately after determining that the combination of the setting values included in the received command has an inconsistency.

As described above, according to the third embodiment, the camera 1000 determines an executable tracking operation when the combination of the setting values included in the received command is not consistent. In particular, when the PTZ configuration can be determined and the PTZ driving can be performed only with the PTZ control value included in the received command, the tracking operation (digital PTZ or optical PTZ) is executed. With these controls, even when there is an inconsistency in the command, it is possible to perform the tracking operation within an executable range without determining that there is an error and stopping the tracking operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-036674, filed Mar. 8, 2021 which is hereby incorporated by reference herein in its entirety.

What is claimed is:

1. An image capturing apparatus comprising:
   one or more memories including instructions stored thereon that, when executed by the one or more processors, cause the image capturing apparatus to function as:
   a driving unit configured to drive the image capturing apparatus and change an imaging region by an image capturing unit;
   a tracking unit configured to track a subject included in the imaging region in a captured video obtained by the image capturing unit;
   a communication unit configured to receive a control command from an external apparatus; and
   a control unit configured to control at least one of the driving unit and the tracking unit based on a control command received by the communication unit;
   wherein
   when a control command received by the communication unit includes a change request to change an imaging region and a tracking request to track a subject and there is an inconsistency in a setting value group of the change request, the control unit controls at least one of the driving unit and the tracking unit without using at least one setting value included in a setting value group of the change request.

2. The image capturing apparatus according to claim 1, wherein
   the driving unit drives a pan-tilt-zoom (PTZ) mechanism on which the image capturing unit is mounted.

3. The image capturing apparatus according to claim 1, wherein
   the tracking unit includes
   a first tracking unit configured to track the subject by continuously operating the driving unit, and
   a second tracking unit configured to track the subject by continuously cropping from a captured video obtained by the image capturing unit.

4. The image capturing apparatus according to claim 3, wherein
   a setting value group of the change request includes an identifier of a profile associated with the image capturing unit and a control value for performing PTZ control, and
   the profile includes a first setting related to a video type to be output by the image capturing unit and a second setting related to PTZ control.

5. The image capturing apparatus according to claim 4, wherein
   the profile is a profile defined by Open Network Video Interface Forum (ONVIF).

6. The image capturing apparatus according to claim 4, wherein
   the first setting indicates whether to output a whole video captured by the image capturing unit or output a cropped video in which a part of the whole video is cropped, and
   the second setting indicates whether to be PTZ control by operating the driving unit or second PTZ control by performing cropping from a captured video.

7. The image capturing apparatus according to claim 4, wherein
   when a control command received by the communication unit includes a change request to change an imaging region and a tracking request to track a subject and the first setting and a coordinate system of the control value are inconsistent, the control unit performs only tracking by the tracking unit based on a tracking request of the subject while ignoring the first setting.

8. The image capturing apparatus according to claim 4, wherein
   when a control command received by the communication unit includes a change request to change an imaging region and a tracking request to track a subject and the second setting and a coordinate system of the control value are inconsistent, the control unit controls performs tracking by the first tracking unit or tracking by the second tracking unit while ignoring the second setting.

9. The image capturing apparatus according to claim 4, wherein
   when a control command received by the communication unit includes a change request to change an imaging region and a tracking request to track a subject and there is an inconsistency in a setting value group of the change request, the control unit controls at least one of the driving unit and the tracking unit using only the control value.

10. The image capturing apparatus according to claim 1, wherein
    the control command is a MoveAndStartTracking command defined by ONVIF.

11. A control method of an image capturing apparatus, the image capturing apparatus comprising
    a driving unit configured to drive the image capturing apparatus and change an imaging region by an image capturing unit; and
    a tracking unit configured to track a subject included in the imaging region in a captured video obtained by the image capturing unit,
    the control method comprising
    receiving a control command from an external apparatus; and
    controlling at least one of the driving unit and the tracking unit without using at least one setting value included in a setting value group of a change request when the control command includes the change request to change an imaging region and a tracking request to track a subject and there is an inconsistency in a setting value group of the change request.

12. A non-transitory computer-readable recording medium storing instructions that, when executed by one or more processors executes a control method for controlling an image capturing apparatus that includes a driving unit configured to drive the image capturing apparatus and change an imaging region by an image capturing unit; and a tracking unit configured to track a subject included in the imaging region in a captured video obtained by the image capturing unit, the control method comprising receiving a control command from an external apparatus; and controlling at least one of the driving unit and the tracking unit without using at least one setting value included in a setting value group of a change request when the control command includes the change request to change an imaging region and a tracking request to track a subject and there is an inconsistency in a setting value group of the change request.

* * * * *